US007693738B2

(12) United States Patent
Guinta et al.

(10) Patent No.: US 7,693,738 B2
(45) Date of Patent: Apr. 6, 2010

(54) COMPUTER-AIDED METHODS AND APPARATUS FOR ASSESSING AN ORGANIZATIONAL PROCESS OR SYSTEM

(76) Inventors: Lawrence R. Guinta, 9743 E. Sharon Dr., Scottsdale, AZ (US) 85260; Lori A. Frantzve, 9743 E. Sharon Dr., Scottsdale, AZ (US) 85260

( * ) Notice: Subject to any disclaimer, the term of this patent is extended or adjusted under 35 U.S.C. 154(b) by 927 days.

(21) Appl. No.: 09/816,678

(22) Filed: Mar. 22, 2001

(65) Prior Publication Data
US 2002/0137015 A1    Sep. 26, 2002

(51) Int. Cl.
*G06Q 90/00*    (2006.01)
(52) U.S. Cl. .................. 705/10; 705/7; 705/8
(58) Field of Classification Search .......... 705/7, 705/8, 10
See application file for complete search history.

(56) References Cited

U.S. PATENT DOCUMENTS

| | | | |
|---|---|---|---|
| 4,764,120 A | | 8/1988 | Griffin et al. |
| 4,905,163 A | | 2/1990 | Garber et al. |
| 5,211,564 A | | 5/1993 | Martinez et al. |
| 5,496,175 A | | 3/1996 | Oyama et al. |
| 5,627,973 A | | 5/1997 | Armstrong et al. |
| 5,704,029 A | | 12/1997 | Wright, Jr. |
| 5,737,494 A | * | 4/1998 | Guinta et al. .................. 706/47 |
| 5,759,101 A | | 6/1998 | Von Kohorn |
| 5,765,038 A | | 6/1998 | Flannery et al. |
| 5,999,908 A | | 12/1999 | Abelow |
| 6,092,060 A | | 7/2000 | Guinta et al. |
| 6,161,101 A | | 12/2000 | Guinta et al. |
| 6,556,974 B1 | * | 4/2003 | D'Alessandro .................. 705/10 |
| 6,662,192 B1 | * | 12/2003 | Rebane .................. 707/104.1 |
| 6,850,892 B1 | * | 2/2005 | Shaw .................. 705/8 |
| 2002/0019765 A1 | * | 2/2002 | Mann et al. .................. 705/11 |
| 2002/0049621 A1 | * | 4/2002 | Bruce .................. 705/7 |
| 2002/0059093 A1 | * | 5/2002 | Barton et al. .................. 705/10 |

OTHER PUBLICATIONS

American Society for Quality Control, "Malcomb Baldrige National Quality Award," 1993 Award Criteria, Booklet Item No. T997; 42 pages.
Mark R. Edwards, Ph.D., "Insight Profiles User's Guide," 1990, TEAMS Booklet; 55 pages.
International Search Report on International Application No. PCT/US95/15930 mailed Mar. 5, 1996; 1 page.

* cited by examiner

*Primary Examiner*—Andre Boyce
(74) *Attorney, Agent, or Firm*—Meyertons, Hood, Kivlin, Kowert & Goetzel, P.C.; Eric B. Meyertons

(57) ABSTRACT

Method and apparatus for computer-aided assessment of organizational process or system. Method and apparatus are adapted to display questions on a computer to an assessor, who then inputs numerical and/or textual inputs relative to the assessor's perception of the process or system. Filtering techniques inhibit entry of unsupported numerical and/or textual inputs which may be untrue and/or exaggerated. Questions used in combination with additional questions provide more accurate assessment of the system or process, where the question combinations already exist in a database. Questions asked may be directed to one or more recognized standards, and duplicative questions from different standards may be omitted. Evaluations of collected information are performed and additional corrective action questions are asked to identify degrees of risk and areas of weakness of the process or system.

31 Claims, 12 Drawing Sheets

(a)

(b)

(c)

(a)

(b)

(c)

COMPUTER-AIDED METHODS AND APPARATUS FOR ASSESSING AN ORGANIZATIONAL PROCESS OR SYSTEM

BACKGROUND OF THE INVENTION

1. Field of the Invention

The invention relates to computer-aided methods and apparatuses for assessing organizational processes or systems.

2. Description of the Relevant Art

Large entities such as corporations, professional associations, and government units often perform organizational assessments both within their own organizations and those of third parties, such as corporate divisions, subsidiaries, departments, and third party providers. The assessments can cover a wide range of topics, often relating to such matters as safety, efficiency, cost control, and reliability. Conventionally, such evaluations have been conducted in conjunction with on-site audits and inspections. Such audits and inspections, however, tend to be burdensome, expensive, and time consuming for both the assessing and audited entities.

To reduce the burdens associated with these evaluations, surveys are commonly employed to gather information concerning organizational processes or systems. A problem with surveys, however, is that validation of the accuracy and truthfulness of answers received is often difficult and expensive, especially when responses are prepared by potentially biased persons, such as suppliers of goods and services.

Another problem with conventional survey techniques is associated with generating an optimal structure for the survey. For example, a useful data gathering technique called "conditional response" involves presenting an assessor a question, and based on the answer to the question, branching to one or more subsequent questions. Each subsequent question may then also branch to further subsequent questions based on answers provided. In this manner, a complicated "tree" of questions and answers may be prepared. One problem with the conditional response technique, however, is that the assessment criteria which direct branching are highly subjective. Thus, the person developing the criteria may bias the survey. Furthermore, preparing or revising a conditional response survey tends to be difficult and expensive since the "tree" is highly structured, thus making preparation of the tree, or revisions to the tree, complicated, time consuming and cumbersome. For instance, if an early question in the tree is changed, then a whole series of subsequent "branching" questions may also have to be changed.

A further problem with the conditional response technique is that available answers tend to be absolute in nature. For example, responses to the questions typically demand a "yes" or a "no" with no option for a qualified response. It is often useful, however, to use other types of questions demanding nonabsolute responses. For example, a survey may call for responses such as numerical responses, multiple-choice responses, arbitrary textual responses, or multiple choices from a number of selections (e.g. "check all that apply"). Although these nonabsolute responses are often useful, adapting them to the conditional response technique often proves complicated and cumbersome.

SUMMARY OF THE INVENTION

A method and apparatus may use a computer to gather information about an organizational process or system by asking an assessor for information about the organizational process or system. Information may be gathered by displaying questions on a computer and storing the assessor's responses. As the information is gathered, the responses may be analyzed. The analysis may perform various functions, such as identifying relevant subject matter, identifying appropriate personnel for submitting responses, accumulating information and evidence relating to the subject matter, filtering biased or exaggerated responses, comparing responses provided against one another and identifying potential solutions or improvements. Data gathered may be stored in a database. Information gathering timelines and improvement project timelines may be stored with a database. The database may be configured to issue reminder notifications and/or escalate schedule concerns as appropriate. "Escalating" may mean notifying a person who is in a position of authority within a first organization, where the first organization is the organization being assessed. For example, a person notified may be in authority over the process or system being assessed, over one or more of the assessors, or over the assessment process. "Escalating" may also mean notifying an individual in second organization, where the second organizations may have requested assessment of the first organization. For example, an issue may be escalated by issuing a notification to a senior manager, or company officer. The method and apparatus may be deployed across a network, intranet, or Internet.

BRIEF DESCRIPTION OF THE DRAWINGS

Other objects and advantages of the invention will become apparent upon reading the following detailed description and upon reference to the accompanying drawings in which.

Figure 1:
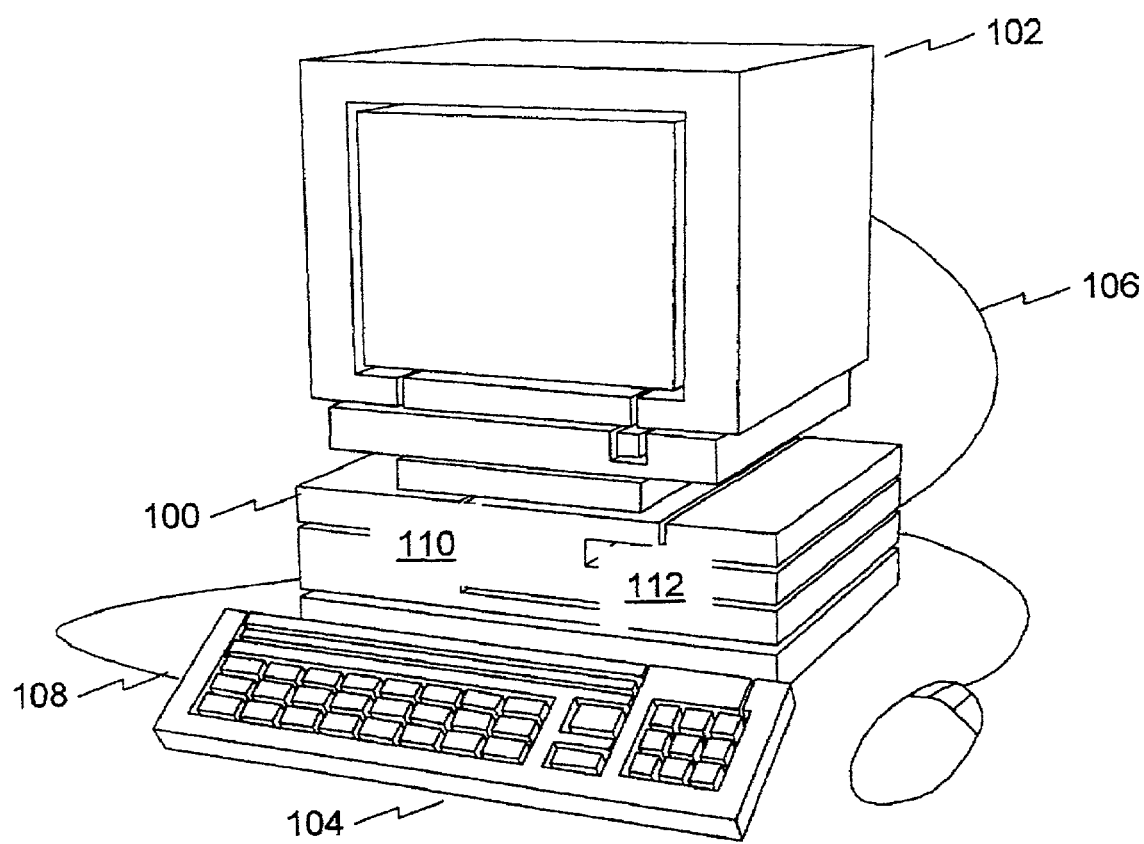
FIG. 1 depicts an apparatus including a computer, a display device, and an input device.

While the invention is susceptible to various modifications and alternative forms, specific embodiments thereof are shown by way of example in the drawing and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Embodiments presented herein may be particularly suited for use in connection with methods and apparatus for assessing an organizational process or system, such as computer-aided systems for measuring, evaluating, and gathering information about organizational processes and systems. As a result, the embodiments are described in that context. It should be recognized, however, that the description is not intended as a limitation on the use or applicability of the present invention, but is instead provided merely to enable a full and complete description of the embodiments.

The term "computer system" as used herein generally describes the hardware and software components that in combination allow the execution of computer programs. The computer programs may be implemented in software, hardware, or a combination of software and hardware. A computer system's hardware generally includes a processor, memory media, and input/output (I/O) devices. As used herein, the term "processor" generally describes the logic circuitry that responds to and processes the basic instructions that operate a computer system. The term "memory medium" includes an installation medium, e.g., a CD-ROM, floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for the reception, storage, analysis, and transmittal of information produced by an Analyte Detection Device (ADD). The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, for executing code and data from the memory medium includes a means for creating and executing the software program or programs according to the methods, flowcharts, and/or block diagrams described below.

A computer system's software generally includes at least one operating system such as Windows NT, Windows 95, Windows 98, or Windows ME all available from Microsoft Corporation, a specialized software program that manages and provides services to other software programs on the computer system. Software may also include one or more programs to perform various tasks on the computer system and various forms of data to be used by the operating system or other programs on the computer system. The data may include but is not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

A web server is a computer system which maintains a web site browsable by any of various web browser software programs. As used herein, the term 'web browser' refers to any software program operable to access web sites over a computer network.

An intranet is a network of networks that is contained within an enterprise. An intranet may include many interlinked local area networks (LANs) and may use data connections to connect LANs in a wide area network (WAN). An intranet may also include connections to the Internet. An intranet may use TCP/IP, HTTP, and other Internet protocols.

An extranet is a private network that uses the Internet protocols and the public telecommunication system to securely share part of a business' information or operations with suppliers, vendors, partners, customers, or other businesses. An extranet may be viewed as part of a company's intranet that is extended to users outside the company. An extranet may require security and privacy. Companies may use an extranet to exchange large volumes of data, share product catalogs exclusively with customers, collaborate with other companies on joint development efforts, provide or access services provided by one company to a group of other companies, and to share news of common interest exclusively with partner companies.

Connection mechanisms included in a network may include copper lines, optical fiber, radio transmission, satellite relays, or any other device or mechanism operable to allow computer systems to communicate.

Referring now to FIG. 1, a computer system suitable for implementing an organizational assessment system according to various aspects of the present invention may include a conventional desktop personal computer system 100. The computer 100 may be configured in any suitable manner to implement various aspects of the present invention. For example, the computer 100 may include a memory 110 and a processing unit 112. The computer 100 may be further adapted, using any suitable computer software or hardware, to perform the various functions as described herein. For example, the computer may comprise an IBM or Apple compatible computer, such as a Sytech 486166 or a Dell 433SINP. Alternatively, the computer 100 comprises any appropriate computer system, such as a mainframe computer, a minicomputer, or a network server.

Computer 100 may include various interfaces to operate in conjunction with an assessor. For example, computer 100 may be coupled via a line 106 to a display device 102, such as a computer screen like a Sony Multiscan 17se or a NEC MultiSync 3FGe computer screen. The display device may be viewed by an assessor while interacting with the organizational assessment system. Computer 100 may also be coupled via a second line 108 to an input device 104 to facilitate the submission of information by the human assessor. The input device 104 of the computer may be a keyboard, a mouse, or a touch screen. In some instances, the input device 104 may include a speech recognition device that converts spoken words into machine-readable inputs. Additional or substitute input and output devices, such as modems, printers, speakers, voice recognition circuitry, or any other suitable input or output device may be connected to computer 100 to facilitate communication with the human assessor or another computer system.

Computer 100 is configured to execute computer programs for assessing an organizational process or system. The computer when operating the computer programs may perform operations such as displaying questions, receiving and storing responses, comparing responses to various values, and preparing reports. An "assessor" may be defined as a person or system which interacts with the computer and the computer program, for example in conjunction with a series of computer-driven questions. The assessor may have at least some knowledge about the organizational process or system. At least some of the computer-driven questions may be adapted to prompt an assessor to submit via input device 104 a response relating to the capability of the organizational process or system to address an issue.

Figure 2:
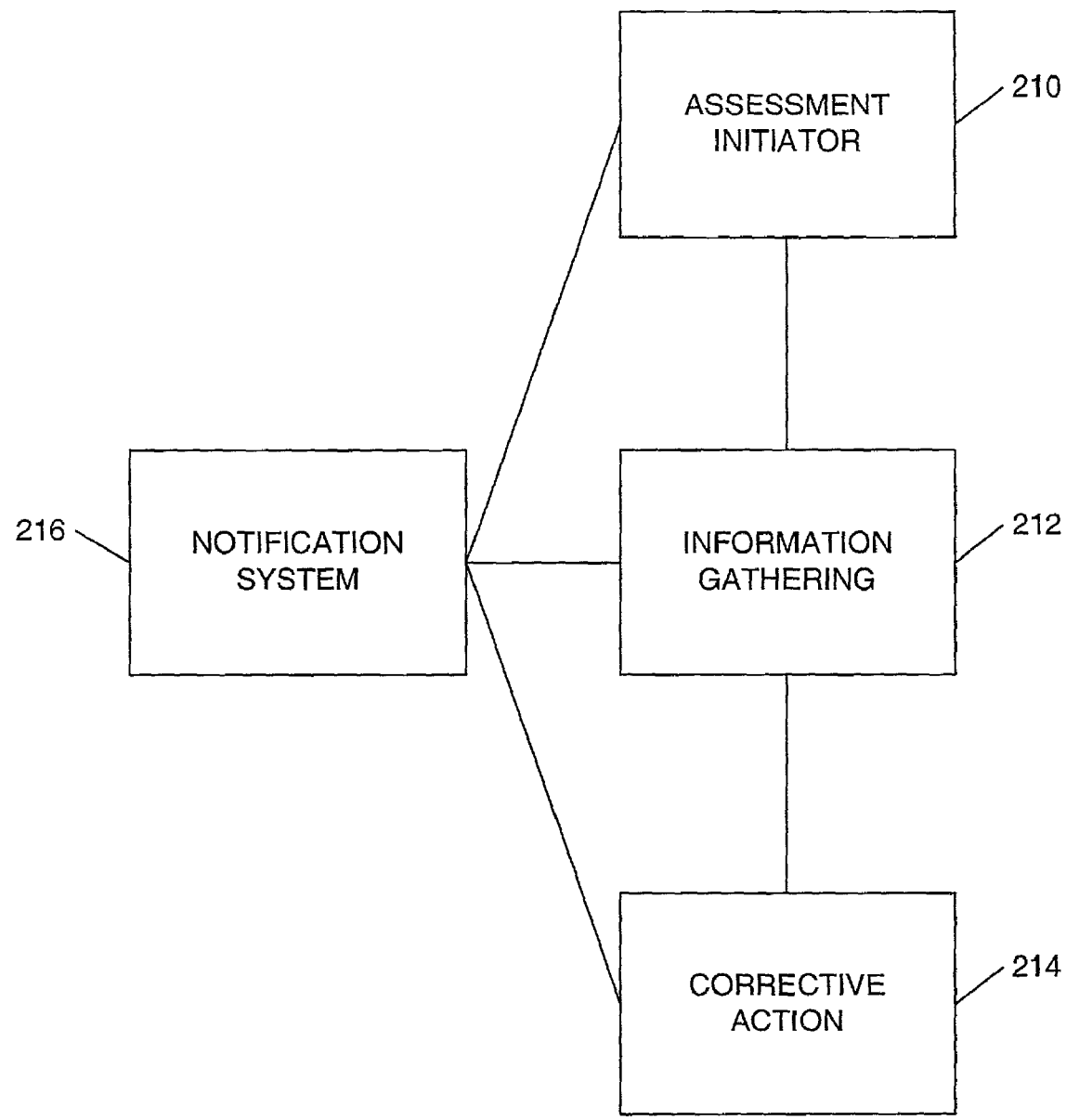
FIG. 2 depicts a general chart of an assessment process according to various aspects of the present invention.

For example, referring now to FIG. 2, in accordance with an exemplary embodiment of an organizational assessment system, a suitable organizational assessment system may include: an assessment initiator system 210; an information gathering system 212; a corrective action system 214; and a notification system 216. Assessment initiator system 210 may interact with an assessment initiator. The "assessment initiator" may be a person initiating the organizational process or system assessment. The initiator may be required to go through multiple security methods to ensure security in user access and privacy of information. Security methods may include, but are not limited to use of certificates, cookies, secure socket layers, virtual private networks, firewalls, etc. For example, the assessment initiator may be a company president or senior officer. Assessment initiator system 210 may, for example, identify personnel to act as assessors for the information gathering system 212. Assessment initiator system 210 may also identify subject matter to be assessed. Assessment initiator system 210 may also gather general organizational characteristics. Information gathering system 212 may then be implemented to accumulate information relating to the relevant processes or systems. Information gathering system 212 may be implemented subsequent to the implementation of assessment initiator system 210. The results obtained and/or generated by assessment initiator system 210 may be used to determine the appropriate implementation of information gathering system 212. The corrective action system 214 may be initiated to identify significant problems and potential solutions. Corrective action system 214 may be implemented subsequent to the implementation of information gathering system 212. The results obtained and/or generated by information gathering system 212, and/or assessment initiator system 210 may be used to determine the appropriate implementation of corrective action system 214. The notification system 216 may be initiated prior to the other systems, and may establish and track an assessment timeline. Notification system 216 may be configured to make notifications to appropriate personnel, for example personnel identified in assessment initiator system 210, regarding the assessment timeline. Although each of these systems suitably operates in conjunction with the others, each of the systems may be configured to operate independently or with less than all of the other systems or features. Further, each of these systems may operate on the same or different computers 100 and may interact with the same or different human assessors.

Assessment initiator system 210 may be configured to identify knowledgeable personnel. Assessment initiator system 210 may be configured to acquire general organizational information. Assessment initiator system 210 may also be configured to perform other functions for facilitating the organizational assessment and the proper performance of information gathering system 212, the corrective action system 214 or the notification system 216. In an embodiment, assessment initiator system 210 may read a series of questions from memory 110 in the computer 100 and provide them to a primary human assessor via display device 102. The questions may be formatted as a single series of questions or provided in any other suitable format, such as in a conditional response format. The primary human assessor may be a person with broad knowledge relating to the organization to be assessed, such as a company president or the head of a division. Assessment initiator system 210 may also operate in conjunction with multiple human assessors, each providing independent responses and information to the questions posed by assessment initiator system 210.

Figure 3:
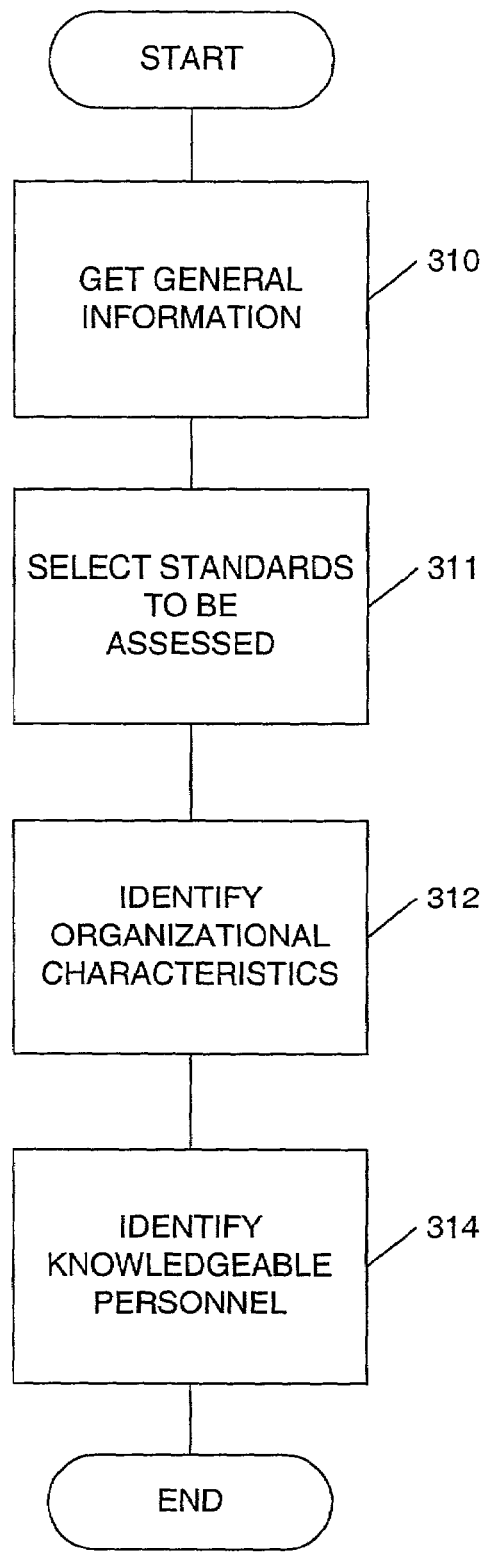
FIG. 3 depicts a general chart of an exemplary assessment initiation system.

FIG. 3 shows a flow chart for assessment initiator system 210. Assessment initiator system 210 suitably performs multiple process steps. For example, the assessment initiator system may initially request general information about the organization (step 310). Such general information might include, but is not limited to, the organization's name, address, type, size, character of its business.

The organizational assessment system preferably includes a plurality of questions directed the requirements of recognized standards. Recognized standards may include national and international standards as well as industry specific standards. The standards may prescribe system or process criteria regarding quality, leadership, cost, delivery, customer satisfaction, manufacturing technology, tool development, and/or environmental, heath and safety concerns. Such standards may include, but are not limited to: ISO 9000, AS 9000, QS 9000, ISO 14000, ASQC, Lean Manufacturing, Six Sigma, etc. The operational assessment system may also include questions directed to financial, and other business concerns, or other topics. For example, Table 1 contains a list of topics that may be presented. The assessment initiator system may request information concerning which standard (or standards) are to be used when evaluating an organizational process or system (step 311).

The assessment initiator system may further request information regarding the characteristics and capabilities of the relevant organization (step 312). For example, the human assessor may be asked questions such as whether the organization has a manufacturing department, a legal department, an accounting department, or the like.

Data acquired by the assessment initiator system relating to the organizational characteristics may be useful for identifying general issues and selecting particular groups of questions to be presented by the assessment initiator system, the information gathering system, and the corrective action system.

Upon entry of such information by the human assessor, the assessment initiator system suitably generates at least one question configured to identify personnel with substantive knowledge of specific subjects pertinent to the assessment (step 314). Such personnel may include, for example, high-ranking employees, supervisors, board members, officers or the like. For example, a first question may request the name and office location of the director of purchasing, and a second question may ask for similar information for the director of human resources. Any number of questions may be posed to identify any number of persons or departments likely to possess relevant information. The nature of these questions may be adjusted according to previous information submitted by the human assessor. For example, if the human assessor previously indicated that the organization has no computer system, questions for identifying the director of computer systems may be omitted. Similarly, if the human assessor indicated that the organization has a legal department, the assessment initiator system 210 may request further information, such as names and office locations for the general counsel, chief patent counsel, and chief litigation counsel.

Notification system 216 may generate an assessment timeline based on information gathered by assessment initiator system 210. Notification system 216 may be configured to export timeline data for use in another software application. For example, notification system 216 may export timeline data which is formatted for use with project management type software application. Exporting timeline data may allow an organization to generate a graph, chart, or other visual summary depicting the timeline. For example, a Gant chart may be generate from the timeline data. In addition, notification system 216 may be configured to merge data gathered by assessment initiator system 210, information gathering system 212, or corrective action system 214 with the timeline data. For instance, general organization information such as address, contacts, etc. may be merged with timeline data for export. Notification system 216 may then initiate information gathering system 212 by notifying appropriate individuals identified by assessment initiator system 210 that the individuals have been selected as assessors to gather specific information relating to the relevant organization within the assessment timeline. Notification system 216 may request acknowledgement of notification and may escalate notification if an acknowledgement is not received in a timely manner. For example, notification system 216 may request that a first individual, identified assessor in assessment initiator system 210, acknowledge receipt of the notification within a predetermined first time period. If receipt of notification is not received by notification system 216 within a predetermined first period of time, notification system 216 may issue a second notification to the assessor. The second notification may include a request to respond with a notification of receipt within a predetermined second time period. If notification of receipt is not received by notification system 216 within the second time period the notification system may escalate the notification. For instance, notification system 216 may notify a second individual of the assessment timeline. Notification system 216 may further notify the second individual that the first individual has not acknowledged receipt of notification within a predetermined time period. The second individual may be an alternate assessor identified in assessment initiator system 210. Alternately, the second individual may be a supervisor, manager, or other organization official empowered to direct the first individual to acknowledge receipt of the notifications, or to select a different assessor instead of the first individual.

In an embodiment, information gathering system 212 may operate in conjunction with a database of questions stored in the memory 110 of the computer 100 to generate at least a portion of a set of questions to be provided to a human assessor. Questions stored within memory 110 may be identified as directed to various standards which may be assessed by the organizational assessment system. For example, questions may pertain to conformance to an ISO 9000 standard. Further, information received by assessment initiator system 210 may be suitably used to formulate the set of questions provided to the human assessors. For example, if the results of the assessment initiator system 210 indicate that the subject organization performs no manufacturing, questions stored in the memory 110 relating to manufacturing issues may be omitted. If the results of assessment initiator system 210 indicate that multiple standards are desired to be assessed, questions related to the multiple standards to be assessed may be selected. Additionally, questions which may be duplicated between two or more standards to be assessed may be omitted. For example, a question set directed to ISO 9000 and a question set directed to ISO 14000 may both contain questions regarding documentation of required training. In an embodiment, an assessor may only be asked one set questions pertaining to training documentation for evaluating both standards. The elimination of redundant questions may reduce the total amount of time required to complete the assessment. In an embodiment, one or more duplicate questions may be retained and addressed to one or more assessors. Retaining one or more duplicative questions may allow problem areas to be identified. For example, if a question regarding the effectiveness of a process is directed to two different assessors, and the two assessors provide significantly different answers, a problem area may be identified. A "problem area" may be an indication that an organizations process or system may not be in conformance to an aspect of a standard being used to evaluate the process or system.

Generally, information gathering system 212 may pose a series of questions, suitably in a conditional response format, to acquire information. The questions may be posed and the responses stored and analyzed, for example to establish the validity and substantiation of the responses. For example, a first input may be received from the input device of the computer system in response to a first question. The first input may be stored in the memory of the computer, and the first input may reflect the assessor's perception of the capability of the organizational process or system to address an issue.

Once the first input is received, it may be compared within a processing unit of computer 100 to a first value. If the first input has a first predetermined characteristic in relation to the first value then the method may involve prompting the assessor to identify evidence that supports the first input. A "predetermined characteristic" may be defined to mean, for example, that the input has a value at least as great, greater than, equal to or less than, or less than the first value. If the evidence identified by the assessor supports the first input, then the method may involve validating the first input for subsequent evaluation. If no evidence is provided or if the evidence identified does not support the first input, then the method may involve inhibiting validation of the first input until the evidence is identified or until the first input is changed to have a second predetermined characteristic in relationship to the first value.

The comparison and validation methods outlined above may have the effect of "filtering" data to remove unsupported, biased, erroneous, or exaggerated data. For instance, an assessor may be prevented from having a favorable rating validated for further evaluation if the assessor cannot identify evidence to support that favorable rating.

In an embodiment, the first input may be a numerical input selected from a scale, for example a 0-100% scale, a 1-3 scale, a 0-10 scale, or a 1-100 scale. This scale may be a sliding bar scale. For instance, the display device may display the following "issue" presented in the form of a statement:

Responsibilities and authorities for all personnel affecting quality are clearly defined and documented.

At this point, the assessor may be asked, "How well does your process (or system) address this issue?" The assessor may then input on a sliding scale of the computer (e.g., typically using arrow keys on a computer keyboard) his or her perception of how well the organization process (or system) addresses the above-referenced issue.

To illustrate, in one example the assessor might enter in a value of 65%, with 100% being, the best evaluation and 0% being the worst evaluation. In such an example, the first value may be, for example, 50%, and the first predetermined characteristic may be defined to mean that the first numerical input is greater than the first value. In this example, since the first numerical input (65%) is greater than the first value (50%), the first numerical input meets the first predetermined characteristic, and therefore the assessor may then be prompted to identify evidence that supports the first numerical input. Such "evidence" may be in various forms. For instance, it may be visible evidence that is simply affirmed by the assessor. In other embodiments the assessor may be requested identify evidence by name, document title, document creation date, review date, and/or other identifying properties.

In other embodiments, the first input may be a true/false or yes/no input, a numerical input, or a textual input. In addition, the first input may be a selection of only one item from a list of several choices. For example, with reference to the above illustration, an assessor may be asked to select one from the following list in response to a statement: very well, adequately, not well, not at all. Alternatively, the first input may be a selection of one or more applicable items from a list of several choices.

In one embodiment, the "evidence" may be affirmed by the assessor if the assessor indicates that the process or system is demonstrable (i.e., can be demonstrated). If the process or system is demonstrable, then the first numerical input may be validated for subsequent evaluation. If the system or process is not demonstrable, then validation of the first numerical input may be inhibited until the assessor indicates that the system or process is demonstrable or until the assessor changes the first numerical input to have a second predetermined characteristic in relationship to the first value. In this context, "validation" means that the numerical input is accepted by or into the computer for future evaluation.

In some embodiments, if evidence is not identified that supports the first input, then the display of subsequent questions may be inhibited until the evidence is identified or until the first input is changed to have the second predetermined characteristic in relation to the first value.

In an embodiment, the "second predetermined characteristic" may be defined to mean that the first input is less than the first value. In the example given above, if the first value is 50% and the assessor indicates that the first input is 65%, then the assessor may be asked to indicate that the process or system is demonstrable. If the assessor does so, then validation and/or display of subsequent questions proceeds. If the assessor does not, then validation may be inhibited, and/or the display of subsequent questions may be inhibited, until the assessor indicates that the process or system is demonstrable, or until the assessor changes the first input to be below 50% (e.g., 45%).

In an embodiment, further computer-driven questions may be displayed on the display device. These computer-driven questions may be adapted to prompt the assessor to input a second input on the input device of the computer. The second input may reflect the assessor's perception of how extensively the organizational process or system is deployed (i.e., how extensively the organizational process or system is actually used). For instance, after the first input is validated, the assessor may be asked to indicate how well the process being assessed is deployed. At this point the assessor may again answer a value (e.g., a percentage value on a 0-100 scale) that is indicative of how well the system or process is deployed. The term "how extensively the organizational process or system is deployed" refers to an assessment of how extensively processes or systems are actually deployed versus theoretically deployed.

The capability of an organizational process or system to address an issue refers to an assessment as to the ability of the theoretical organizational process or system to address an issue. In other words, the first input reflects an assessment as to whether the organizational process or system can address an issue. The second input then reflects how extensively the organizational process or system is actually deployed to address that issue. In other words, does the assessed process or system actually operate or does it sit on the shelf and/or only theoretically operate? For instance, a process or system may have a high (e.g., 90%) first input indicating that the process or system has a favorable ability to address the issue, but the second input may relatively low (e.g., 30%), indicating that process or system is not widely deployed.

Superior results have been achieved by prompting these questions together in conjunction with filtering techniques (examples of results achieved are shown in U.S. Pat. Nos. 5,737,494; 6,092,060; and 6,161,101 which are incorporated herein by reference). The results are achievable because an apparatus adapted to prompt these combinations of questions in conjunction with filtering techniques may address the following two phenomena frequently encountered when assessing a process or system: (1) a process or system is not supported by evidence but the users nevertheless use this process or system, or (2) the process or system is supported by evidence but it is not used. If either of these phenomena is present, then the first input relating to the assessed process or system may be dependent on knowledge embedded within workers. These workers, however, may quit, retire, be promoted, or otherwise cease performing, all without "passing on" the knowledge which enabled the assessed process or system to achieve the first input. Thus, the stability of the first input is questionable if either of these two phenomena is present.

The filtering techniques provide information concerning the first phenomenon. As described above, these filtering techniques also tend to inhibit favorable first inputs that are unsupported. Thus, these filtering techniques may increase the accuracy of the first input if the first phenomenon is present. The second input provides information concerning the second phenomenon. This information can be used with the first input in subsequent evaluations (e.g., by mathematical manipulation such as multiplying the first input by the second input to obtain a combined input value). Thus, an apparatus adapted to prompt the first and second numerical inputs, in combination with the filtering techniques, may have the effect of providing information about, and/or increasing the accuracy of, the first input. The above-described information that is provided "about the first input" can be reflective of the stability of the first input.

In the above-described manner, an assessor may be prompted to provide filtered numerical inputs that may together be used to evaluate the process or system. For instance, a first numerical input may be multiplied by a second numerical input (e.g., 90% times 30%=27%) to provide a multiplied evaluation factor that combines the characteristics of both inputs. Alternately, a plurality of first numerical inputs from various assessors may be used, and one or more standard deviations for the first and second numerical inputs may be calculated and compared or used in combination with each other for evaluation purposes. A wide variety of issues may be surveyed by a wide variety of assessors.

Many types of filtering techniques may be used in evaluating the inputs. For example, any sort of mathematical manipulations can be used, include multiplying, adding, subtracting, dividing, calculating standard deviations between, the first numerical input with the second numerical input, or vice versa.

The results of the filtering techniques may be evaluated to determine problem areas that might warrant on-site investigation. For instance, if 100 different issues were assessed by 10 different assessors, the average multiplied evaluation factor might be 55%, with only 8 issues being below 45%. On-site evaluation teams might then be directed to focus their efforts on investigating the 8 issues that were below 45% instead of all 100 issues, thereby saving manpower and expense. Alternately, the on-site teams could be directed to investigate issues that had standard deviations above a certain value (e.g., 8%). Again, the efforts of the on-site team would be focused and reduced, thereby saving manpower and expense.

Information or data collected may be sent via an intranet, extranet, the Internet, etc. Data collected may be sent to a computer in the form of a database, text files, graphics files, files viewable by a web browser, or other file formats. Additionally, data collected may be sent to a printer or data collection device such as memory 110 in computer 100. Further evaluation may be achieved by having one computer or control system automatically interact with another, wherein the second computer or control system is requested to gather or retrieve further data for validation or evaluation purposes. For instance, the second computer or control system may be adapted to provide information that verifies or confirms that numerical inputs are reasonably accurate.

Figure 10:
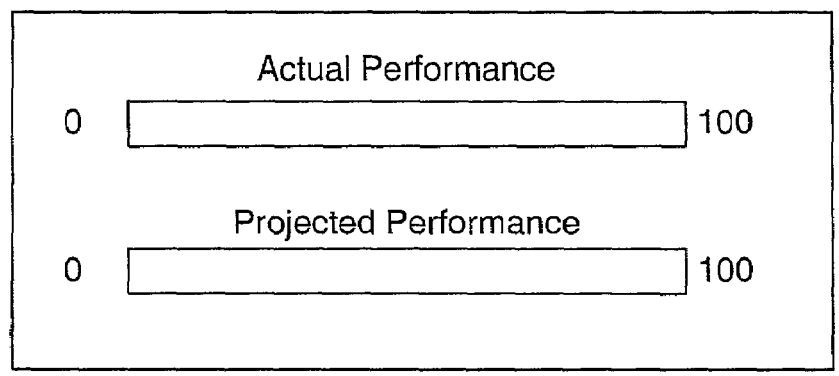
FIGS. 10A-C depict a series of "double sliding bar" displays.
Figure 10:
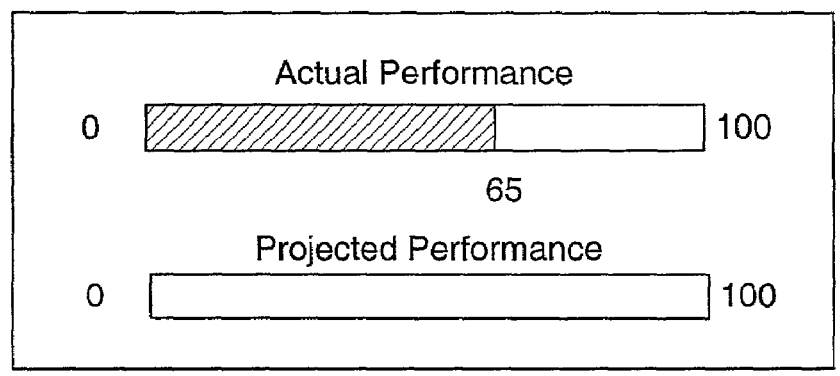
Figure 10:
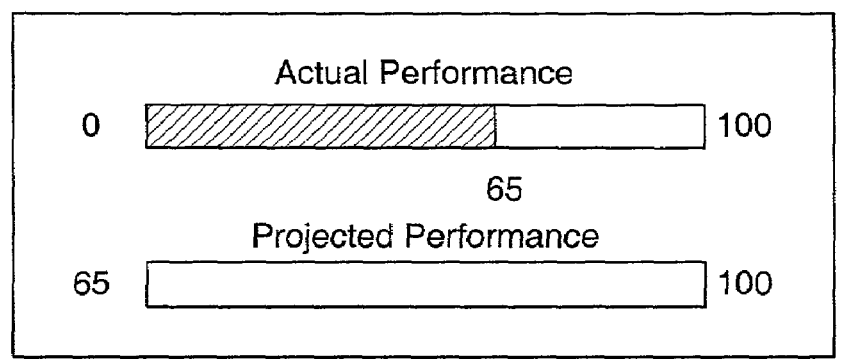

In addition to assessing an existing process or system, an organizational assessment system may be configured to prompt assessors to provide recommended changes or improvements to an existing process or system. In an embodiment, the recommendation may be accompanied by a measure of the expected benefit to accompany the recommendation. An assessor may provide numeric input via a user adjustable icon system. In an embodiment, a user adjustable icon system may comprise two user adjustable icons wherein the range of allowed input for a second user adjustable icon, is limited by input from a first user adjustable icon. In an embodiment, the user adjustable icons may be sliding bars, as depicted in FIGS. 10A-C. For example, the range of allowed second numerical input in a second selected scale may be limited by a first numerical input selection made on a first scale. In such an example, the first input may represent the assessor's perception of the effectiveness of an existing process or system, and the second numerical input may represent the assessor's perception of the expected effectiveness of the process or system after the recommended change is made. A user may be prompted to provide a first numeric input corresponding to the user's perception of the current performance of an organizational process or system (FIG. 10A). For example, a first input may be made by selecting 65 on a sliding bar having a range of 0-100 (FIG. 10B). The range of a second sliding bar for a second numerical input may then be limited by the computer to have a 65-100 scale (FIG. 10C.).

Figure 4:
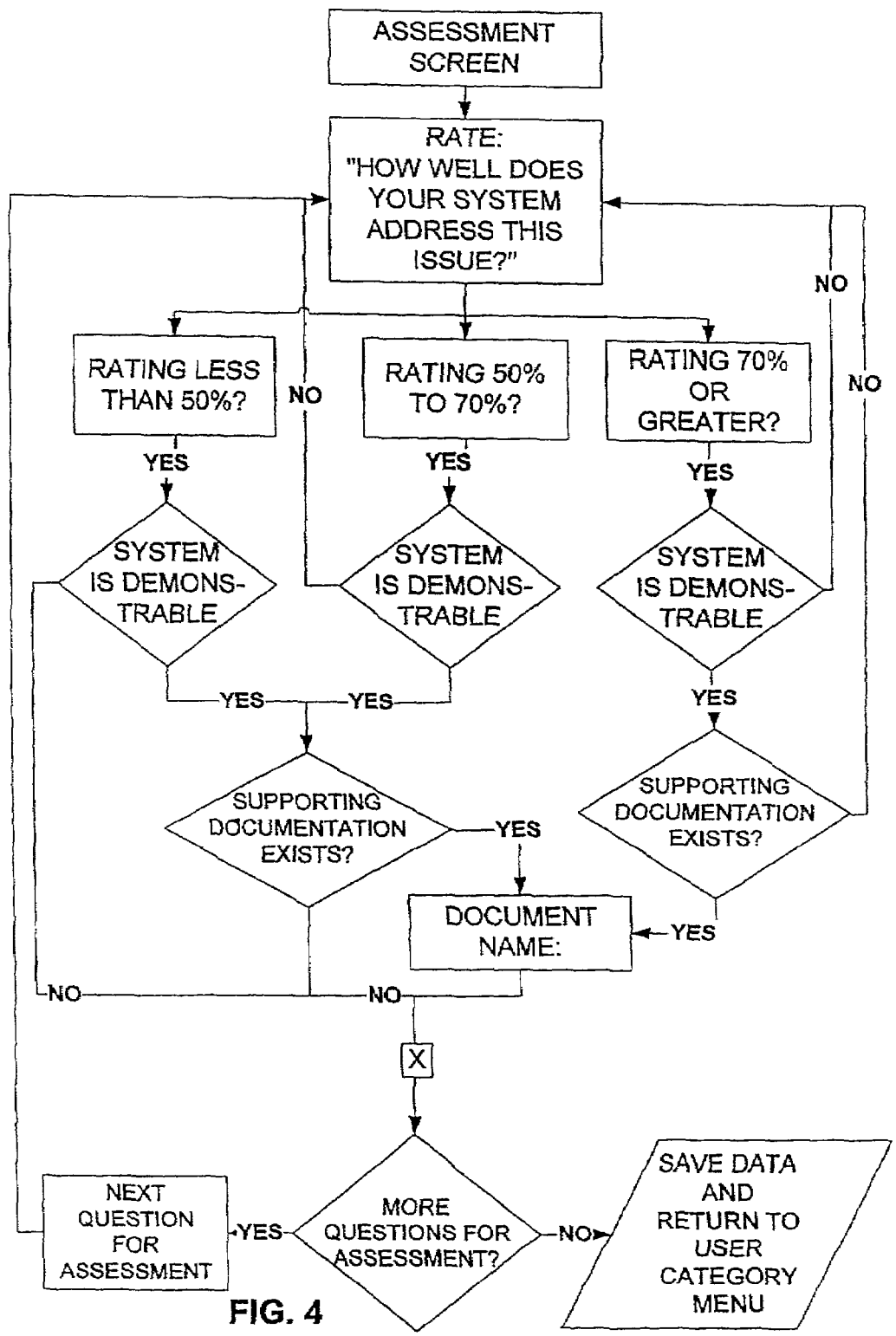
FIG. 4 depicts a flow-chart wherein an assessor is prompted to input a numerical input reflective of how well a system addresses an issue.

FIG. 4 demonstrates an embodiment which includes an assessment screen adapted to display a question in the form or a statement or issue. A "question" may be presented in multiple ways. For instance, a question may be a standard "yes/ no" or "true/false" answer form (e.g., Does the ABC system maintain on-time performance records?). In addition, the question may be presented by making a statement, or stating an issue, and then asking the assessor to evaluate the statement or issue on a numerical scale. For instance, the assessor may be presented with the statement that "the ABC system maintains on-time performance records." In response thereto, the assessor may enter a value on an analog scale reflecting the accuracy of the statement (e.g., 6 on a 1-10 scale, with 10 being the most favorable rating).

In FIG. 4, a series of statements or issues (such as those depicted in Table 1) may be shown on the assessment screen. The following question may then be displayed:

"How well does your system address this issue?"

At this point, the assessor may be prompted to input a numerical input, on an analog percentage scale, which reflects how well the assessed system addresses the issue. As shown by the arrows in FIG. 4, if the rating is less than 50%, then the assessor may be asked if the system is demonstrable. If the answer is "no," then additional displays may be shown as represented by Box X in FIG. 4. If more questions are scheduled to be presented to the assessor, then the process or apparatus may proceed to the next question for assessment. If no more questions are scheduled, then the data may be saved and the assessor may be returned to a user category menu.

In FIG. 4, the first numerical input may be compared to other values besides the first value (the first value in this application acts as a trigger point, or set point). For instance, the first numerical input may be compared to determine if it is between 50-70%. If the first numerical input is between 50% and 70%, then the assessor may be asked to indicate whether the system is demonstrable, as shown in FIG. 4. If the system is not demonstrable, then the assessor may be asked to change the rating. In other words, the system shown in FIG. 4 may inhibit display of subsequent questions if evidence (e.g., system demonstrability) is not presented that will support ratings in the range of 50-70%. In FIG. 4, if the first numerical input is between 50-70% and the system is demonstrable, then the assessor is asked further questions as outlined above for FIG. 4 (e.g., if supporting documentation exists, etc.).

The system in FIG. 4 also has the capability of comparing the first numerical input to a third value. If the first numerical input is 70% or greater, then the assessor is asked to determine if the system is demonstrable. If the system is not demonstrable, then the apparatus inhibits display of subsequent questions until the assessor changes the rating (i.e., lowers the first numerical input below 70%). If the system is demonstrable, the assessor is subsequently asked if supporting documentation exists. If the assessor indicates that no supporting documentation exists, then again the display of subsequent questions is inhibited until the assessor indicates that supporting documentation exists or changes the first numerical input to a lesser value.

In FIG. 4, Box X may indicate that the first numerical input is validated. In this context "validation" may simply mean that the first numerical input is stored, that the assessor is not inhibited from proceeding to subsequent questions, and/or that the display of subsequent questions is not inhibited.

The process shown in FIG. 4 may have the effect of "filtering" assessment indicia. As shown in FIG. 4, as the rating (i.e., numerical input) becomes more favorable (i.e., higher), then greater levels of evidentiary support may be required. If the rating is less than 50%, then the assessor may still proceed to Box X even if the assessed system is not demonstrable. Of course, if the assessed system is demonstrable, then information is received by the apparatus, and if the supporting documentation exists, that information is also received by the apparatus. If the first numerical input is between 50-70%, then a greater level of evidence may be required before the assessor may proceed to Box X. Specifically, at least system demonstrability must be indicated. Otherwise, the assessor must change (e.g., lower) the first numerical input. Again, if supporting documentation exists, the information is received by the apparatus. Finally, if the numerical input is 70% or greater, then system demonstrability and supporting documentation must exist. Otherwise, the assessor must change the first numerical input to a lesser value.

In effect, the apparatus shown in FIG. 4 filters the data collected by inhibiting validation/collection of exaggerated, untrue, and/or unsupported numerical inputs. Furthermore, as a numerical input becomes more favorable, then the level of support required for that rating also increases.

The numerical input shown in FIG. 4 may be modified based on a wide variety of factors preferred by the apparatus designers. For instance, in some processes alternate rating systems may be preferred (e.g., a rating system of 1-10, where 1 is the most favorable rating). In such a case, appropriate revision of the levels of evidence as correlated to numerical inputs would be required. In some instances, numerical inputs may be utilized to indicate specific events or circumstances (e.g., 1=daily, 2=weekly, 3=monthly, 4=yearly, or 1=always, 2=sometimes, 3=never, etc.)

Figure 5:
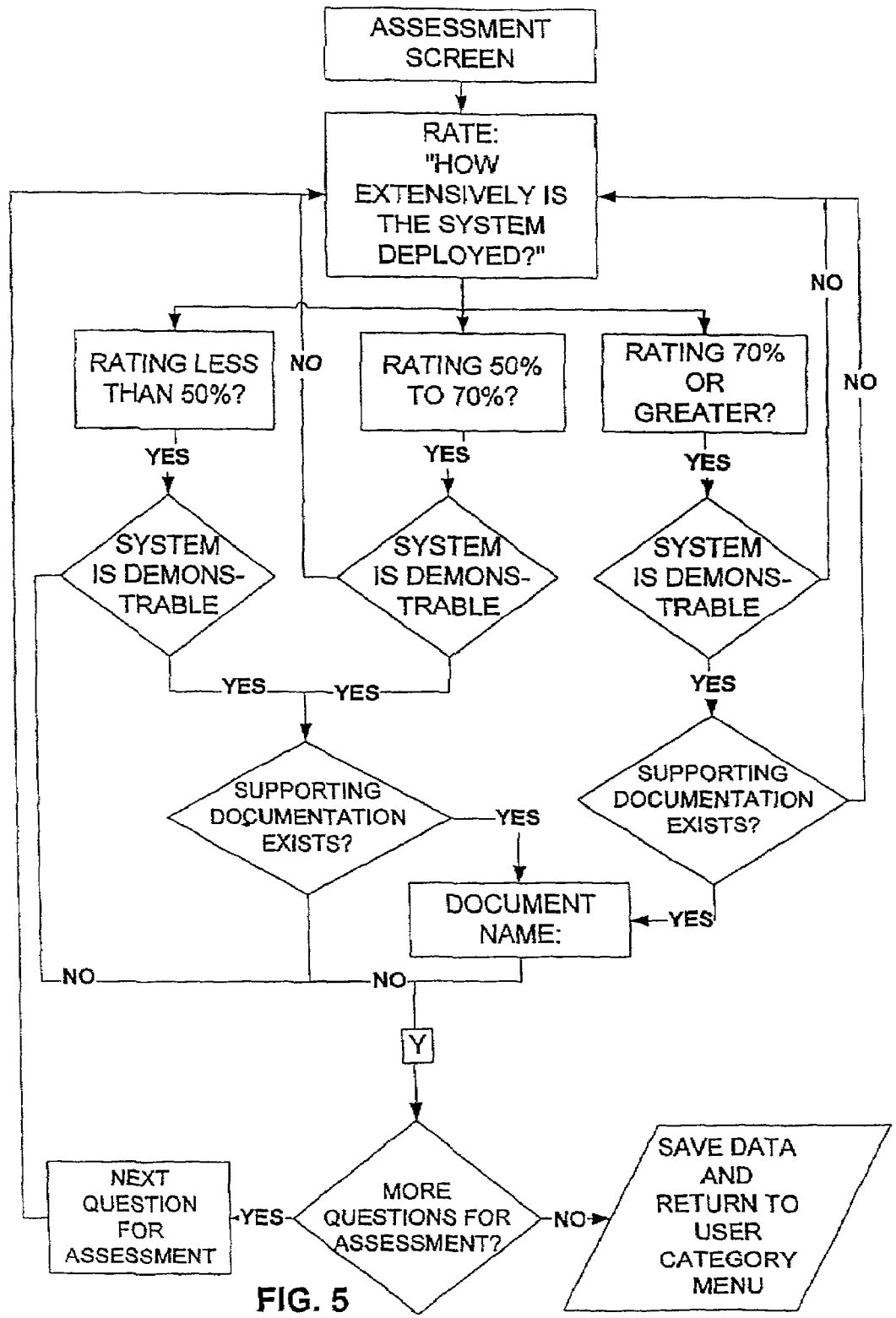
FIG. 5 depicts a flow-chart wherein an assessor is prompted to input a numerical input reflective of how extensively a system is deployed.

In FIG. 4, Box X may represent a series of subsequent questions presented to the assessor. For instance, Box X may be represented by the process shown in FIG. 5. In FIG. 5 a question may be displayed on a display device which would ask for a second numerical input reflecting the assessor's perception of how extensively the organizational process or system is deployed. Again, a filtering apparatus may be employed in conjunction with the second numerical input to correlate more favorable ratings with varying levels of evidence. This filtering apparatus may be similar to the FIG. 4 filtering apparatus. Depending on the level of the second numerical input, then varying levels of evidence may be required to arrive at Box Y. Box Y may serve similar purposes as Box X. That is, it may serve to validate the second numerical input, or represent subsequent questions to be displayed to the assessor.

Figure 6:
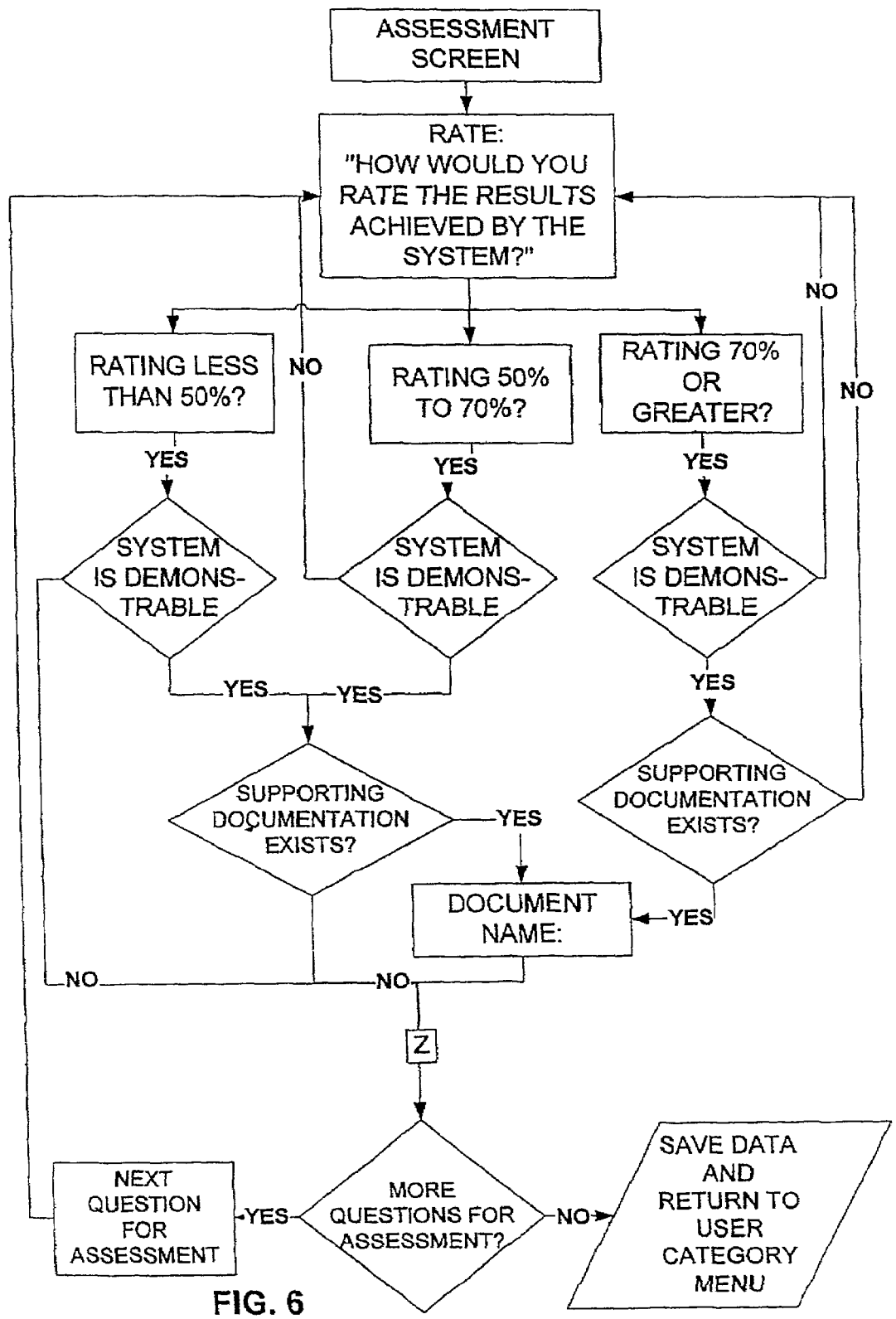
FIG. 6 depicts a flow chart wherein an assessor is prompted to input a numerical input reflective of results achieved by the system.

FIG. 6 depicts a process analogous to that of FIG. 4, except the initial questions is:

"How would you rate the results achieved by the system?"

In FIG. 6, a third numerical input is input into the system, the third numerical input reflecting the assessor's perception of the results achieved by the organizational process or system. A filtering apparatus similar to the filtering system shown in FIG. 4 may also be employed. Box Z in FIG. 6 may represent subsequent questions to be asked.

Some embodiments may employ the process of FIG. 4 with the process of FIG. 5, the process of FIG. 4 with the process of FIG. 6, the process of FIG. 4 with the systems of FIGS. 2 and 3, and the process of FIG. 5 with the process of FIG. 6. Furthermore, the order of the processes may be reversed or mixed. For example, questions presented in the process of FIG. 5 may be asked first followed by questions in the process of FIG. 4.

A process combining FIG. 4 with FIG. 5 may provide superior evaluation results. It is believed that the superior results may be achieved because the process of FIG. 4 provides an assessment as to how well a system may address an issue, however it does not provide an assessment on how extensively the system is deployed. Thus, a system may work (i.e., address an issue) particularly well (i.e., greater than 90%); however, it may only be minimally deployed. By using the processes of FIG. 4 and FIG. 5, an assessment as to the capability of the system combined with an assessment as to system deployment may be achieved. For instance, if the system addresses the issue particularly well (i.e., at 90%) but is only 60% deployed, then in one embodiment a combined assessment of 90% times 60%=54% may be calculated. Such combined assessments may be particularly helpful to focus on-site assessment team efforts.

Figure 7A:
FIGS. 7A-7E depict a series of "sliding bar" displays.
Figure 7B:

FIGS. 7A-7E depict a series of screen displays for the VIRTUAL ASSESSOR (formerly MAXUS and MAXSYS) process/apparatus provided by Intellimet, Inc (Scottsdale, Ariz.). As shown in FIG. 7A, the following initial "issue" or statement within the category "management responsibility" is displayed: "Quality policy is communicated, understood and maintained throughout the organization." The assessor is then prompted to input, on a sliding bar 0-100% scale, a first numerical input that reflects his or her perception as to how well the assessed process (or system) addresses this issue. As shown in FIG. 7B, the assessor in this example input a first numerical input of 58%.

At this point the assessor may be prompted (e.g., the word "yes" is highlighted) to indicate whether the system is demonstrable or not. Such indication may be made by the assessor pressing the "enter" key when "yes" is highlighted. To indicate "no" the assessor may use an input device to move the highlight so that "no" is highlighted instead of "yes" and then pressing the "enter" key. If the first numerical input of 58% is higher than a first value (e.g., higher than 50%), then the assessor may be required to indicate that the assessed system is demonstrable. Otherwise, the apparatus may inhibit display of subsequent questions and/or prompt the assessor to provide a new (and in this case a lower and less favorable) first numerical input. In this example, the assessor indicated "yes" so subsequent questions were not inhibited and the assessor was not asked to input a new numerical input.

Figure 7C:

As shown in FIG. 7C, the process may then prompt the assessor to indicate whether supporting documentation existed. If the first numerical input (here, 58%) is higher than a second value (e.g., higher than 60%), then the assessor may be required to indicate that supporting documentation exists. Otherwise, the apparatus may inhibit display of subsequent questions and/or prompt the assessor to provide a new (and in this case a lower and less favorable) first numerical input. In this example, the assessor indicated "yes" so, as shown in FIG. 7D, the apparatus prompted the assessor to identify documents by providing document names.

The "system is demonstrable" and "supporting documentation exists" statements, and their associated "yes or no" questions are filtering mechanisms to help inhibit/prevent collection of exaggerated or untrue data. Using known empirically gathered information, the apparatus may be adapted to have first, second, or subsequent values that serve as "trigger" or "set" points to require higher levels of evidentiary support. The theoretical basis for this apparatus is that, on average, filtered perceptions of quality, as indicated by relatively high first numerical inputs, reflect actual conditions. For instance, in the example shown above, a system must be demonstrable to support a first numerical input rating greater than the first value (here, greater than 50%), and then the system must have supporting documentation to support a first numerical input rating higher than a second value (e.g., higher than 60%).

Figure 7D:
Figure 7E:
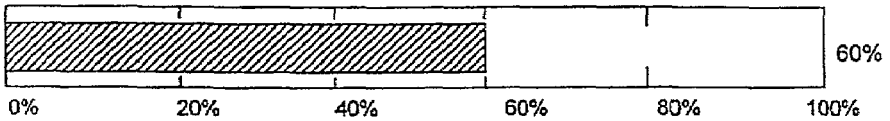
Figure 8:
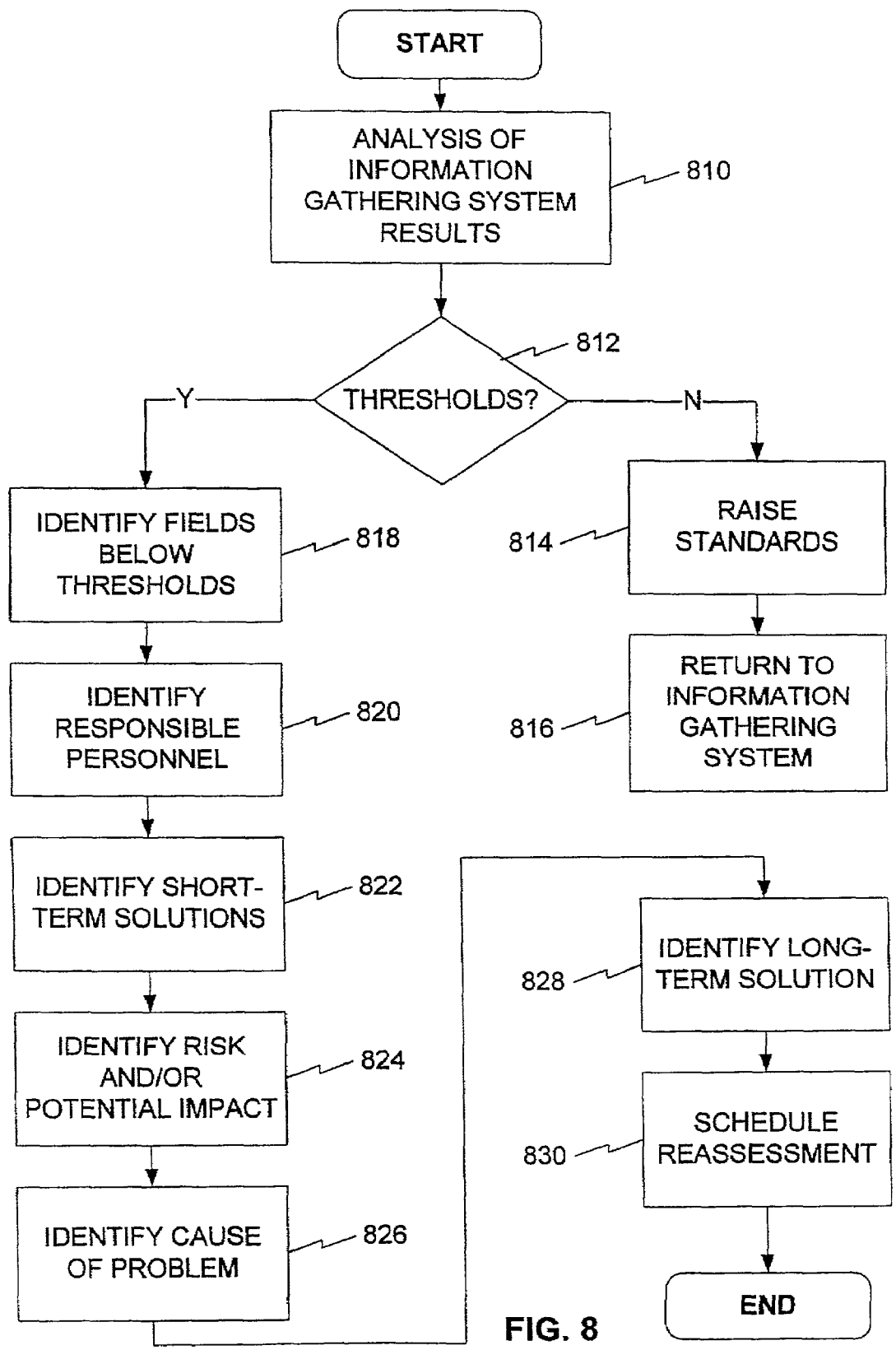
FIG. 8 depicts a flow chart for a corrective action system.
Figure 9:
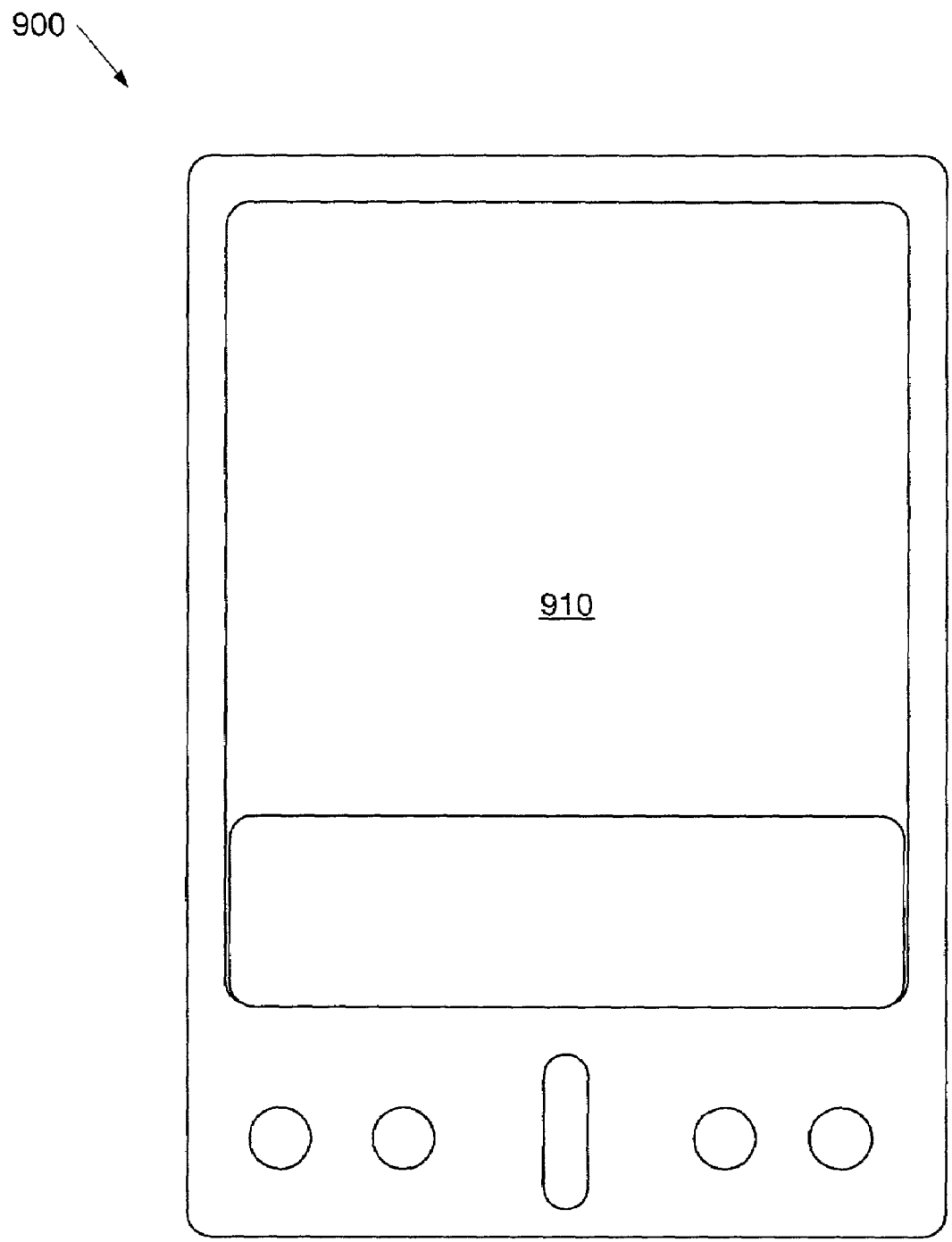
FIG. 9 depicts a schematic view of an embodiment of a personal digital assistant.

After entering at least one document name, document date, etc. in FIG. 7D, the display screen shown in FIG. 7E may be displayed. FIG. 7E prompts the assessor to input a second numerical input which reflects the assessor's perception of how well the process is deployed. In other words, the assessor inputs a numerical evaluation of how extensively the assessed process (or system) is actually used or deployed. Upon completion of information gathering system 212, corrective action system 214 may be initiated. Corrective action system 214 may analyze the data accumulated by information gathering system 212 to identify problem areas and explore resolution of the problems. Referring now to FIG. 8, the corrective action system may analyze the data gathered by information gathering system 212 to detect problem areas (step 810). For example, the data for each of the fields, i.e., the topics addressed by the information gathering system, may be summarized into a single value for the field. The summary may be generated in any manner, such as statistical methods like finding the mean, median, or mode of numerical responses. To identify specific problem fields, the summarized results may be compared to selected thresholds (step 812). The thresholds may be selected in any suitable manner, for example approximating industry average values for such fields or minimum values required to satisfy particular evaluation criteria. Results may also be compared across assessors or standards assessed. For example, in the information gathering system, two or more assessors may be asked similar or related questions. The results of the answers provided may be compared to determine if inconsistent answers were provided. Likewise, one or more similar or related questions may be presented with regard to different standards being assessed, and answers may be compared to determine if inconsistent answers were provided.

If all of the summary values for the fields exceed the selected thresholds, and no inconsistent answers are identified the corrective action system may terminate. Alternatively, the thresholds may be raised to a level corresponding to an improved state of operation (step 814) and the results analyzed again in view of the new set of thresholds (step 816). In any event, if any of the summarized values fail to exceed the selected thresholds, or inconsistent answers are identified, the particular fields are identified for further analysis (step 818).

Following identification of the relevant fields, the corrective action system may generate a set of questions for each of the relevant fields and pose them to the appropriate personnel. The appropriate personnel are likely to be the personnel identified in conjunction with the application initiator system as being in charge of the departments associated with the relevant fields. The questions may be designed to assess the magnitude of the problem, the cause of the problem, and/or solutions to the problem. For example, a first set of questions may require designation of a responsible person or persons for addressing the problem (step 820). A next set of questions may be designed to determine optimal short-term solutions to the problem to be implemented by the designated responsible person (step 822).

After identifying short-term solutions, the corrective action system may provide questions relating to a more complete solution of the problem. For example, a set of further questions may be presented to determine the magnitude of the risk and/or potential impact associated with the problems in the field (step 824). Additional questions are suitably presented to identify the fundamental causes of the problem (step 826) and potential solutions for neutralizing those causes and remedying the problem (step 828). Finally, the corrective action system may implement a calendaring set of questions configured to interactively generate a timetable for resolution of the problem and performance of a supplementary organizational assessment within the problem fields (step 830). Notification system 216 may generate a timeline for completion of corrective actions or for a supplementary organizational assessment based on the calendaring questions. Notification system 216 may provide notification to identified individuals of timelines and/or due dates for corrective actions or supplementary organizational assessments. Notification system 216 may also provide notification of deadlines which may be exceeded.

Once the assessment information is collected and evaluated, reports may be created summarizing the information, suitably by computer 100. For example, these reports might identify an organization's strengths and weaknesses. The report might also suggest guidelines for the organization to improve the weaknesses, for example in accordance with the information accumulated by corrective action module 214. In an embodiment, the report generating process may include information relating to the correlation of the respondents' responses with one another, a summary of the respondents' views relating to various issues, additional sources of data identified by the respondents, or any other information which may be drawn from or generated in conjunction with the information obtained by the organizational assessment system.

Information gathered in the assessment may be stored in a database in the memory 110 of computer 100. The database may be configured to allow an authorized user to search for information related to an organization or assessment. For example, a search may be conducted to identify a company which manufactures a particular item and has various characteristics which may be determined by the organizational assessment system.

Although the present invention is directed towards computer-driven assessments, computers may not be available to the assessors who need to answer questions. Therefore, an organizational assessment system according to various aspects of the present invention may be configured to generate a set of questions suitable for printing to hard copy for use. Preferably, the particular selection of questions is generated following a computer-driven implementation of assessment initiator system 210. Based on the responses provided by the human assessor to assessment initiator system 210, a selection of questions may be derived from a collection of questions stored in memory 110 of computer 100. Further human assessors are given hard copies of the questions and answer sheets. The answer sheets typically contain numbers which correspond to the question numbers. Next to the answer sheet numbers are a plurality of circles or other indicia which correspond to the answer choices presented with each question. To answer a question, the assessor may darken the circle or otherwise marks or designates the area which corresponds to the appropriate answer. The answer sheets may be entered into a computer system. In an embodiment, the answers sheet may be scanned into computer 100 and the assessment, including information gathering system 212 and corrective action system 214, can be continued on the computer.

In an embodiment of the invention, the apparatus and process of the invention may be adapted to compare numerical inputs (relating to a plurality of issues, or categories of issues) for a plurality of suppliers. In this manner an objective, relatively quick and inexpensive assessment of the suppliers may be completed. Additionally, industry standards may be established, and on-site evaluations may be directed to focus their inspection efforts in areas that are below, or not within, industry norms.

Methods and apparatus of an organizational assessment system as described herein may be useful to reduce the scope of onsite assessments performed by an organization. For example, a first company desiring to assess a second company may traditionally employ assessors to go onsite at the second company to gather information related to the standards to be assessed. Typically, the second company may be a supplier of materials or services to the first company. Embodiments described herein may be used by the first and second companies to reduce the amount of specific information to be gather by onsite assessors by identifying areas which may be of concern, and areas which may not be of concern. Additionally, a first company may employ embodiments described herein to determine which organization or organizations from a group of organizations to perform onsite assessment of. For example, a first company may have 100 suppliers. Data gathered by embodiments described herein may be used to identify suppliers which pose the greatest risk to the first company (that is suppliers with processes or systems which do not conform to the assessed standard, or suppliers which supply products or services deemed critical to the first companies business.)

In an embodiment where onsite assessment is in conjunction with the method and apparatus described herein, onsite assessors may be provided data gathered by the assessment initiator system, information gathering system 212, and/or corrective action system 214. Data provided to onsite assessors may include for example, areas for which corrective actions were required, corrective action plans, and corrective action timelines.

Data provided to onsite assessors may be in an electronic format, for example, assessors may be provided with a PDA 900, such as Palm Pilot, available from Palm, Inc. Assessment data may be loaded into memory 910 of the PDA 900 A software application in the memory 910 of the PDA 900 may allow the onsite assessor to view assessment data, and edit or add some data. Onsite assessors may verify information provided by assessors, status of corrective actions, etc. Information gathered by onsite assessors may be placed into a database in the memory 110 of computer 100. Information provided by onsite assessors may be in the form of numerical answers to questions posed.

The organizational assessment system may be configured to adjust individual onsite assessor's answers. An estimate of an onsite assessor biases may be the basis for adjusting the individual assessor's answers. An assessor may be asked a series of questions to gauge the individual's biases statistically, as compared to other onsite assessors previously asked the same question. For example, an auditor may be asked to rate the percent complete of a given corrective action plan based on given information. The assessor's numeric answer may then be compared to the answers of other assessors previously asked the same question. An overall average answer may be established as a reference point, the individual assessor may then be assigned a bias score as related to the average. Each assessor's onsite assessment answers may be adjusted by a bias score thus established.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

TABLE 1

4.1 MANAGEMENT RESPONSIBILITY

1. Quality policy is communicated, understood and maintained throughout the organization. (I.4.1.1)

TABLE 1-continued

2. Responsibilities and authorities for all personnel affecting quality are clearly defined and documented. (I.4.1.2)
3.1 Authority delegated to personnel to prevent nonconformity reoccurrence. (I.4.1.2)
3.2 Authority delegated to personnel to identify & record quality problems. (I.4.1.2)
3.3 Authority delegated to personnel to initiate & verify corrective action. (I.4.1.2)
3.4 Authority delegated to personnel to control further processing. (I.4.1.2)
4. A multi-disciplinary approach is used in the design process with direct input in decision making. (I.4.1.2)
5. Periodic top management review of quality system effectiveness is supported by appropriate records. (I.4.1.3)
6. Qualified technical personnel are available for design, process, product and service support. (I.4.1.2.2)
7. Management representative with authority & responsibility to ensure standards compliance (i.e. ISO-9000, QS-9000, NQA, etc.) is clearly defined. (I.4.1.2.3)
8.1 Documented business plan(s) consider standard's requirements (i.e. ISO-9000, QS-9000, NQA, etc.) including competitive product analysis. (as applicable) (I.4.1.4)
8.2 Documented business plan(s) considers the standard's requirements (i.e. ISO-9000, QS-9000, NQA, etc.) and benchmarking. (as applicable) (I.4.1.4)
8.3 Documented business plan(s) considers standard's requirements (i.e.ISO-9000, QS-9000, NQA, etc.) and R&D plans. (as applicable) (I.4.1.4)
8.4 Documented business plan(s) considers standard's requirements (i.e.ISO-9000, QS-9000, NQA, etc.) of internal quality and operational performance measures (as applicable) (I.4.1.4)
9. Data is used to focus on competitors and/or appropriate benchmarks for improving quality, productivity, and operation efficiency. (I.4.1.5)
10. Documented and objective processes are used to measure customer satisfaction. (e.g.: a plan with short and long term actions addressing customer dissatisfaction factors.) (I.4.1.6)
11. Cross-functional teams are used for the quality planning process. (I.4.2.1)

4.2 QUALITY SYSTEM

1. Quality Manual adequately meets QS-9000 requirements for documentation of a comprehensive quality system.
2.1 Quality planning process is consistent with the elements of the quality system that addresses Product Program plan preparation. (I.4.2.3)
2.2 Quality planning process is consistent with the elements of the quality system that addresses identification and acquisition of the appropriate resources. (I.4.2.3)
2.3 Quality planning process is consistent with the elements of the quality system and addresses conducting design and process compatibility studies. (I.4.2.3)
2.4 Quality planning process is consistent with the elements of the quality system and addresses updating and maintenance of all quality control and inspection methodology. (I.4.2.3)
2.5 Quality planning process is consistent with the elements of the quality system and addresses identification of suitable verification at appropriate stages. (I.4.2.3)
2.6 Quality planning process is consistent with the elements of the quality system and addresses preparation of control plans and FMEAs. (I.4.2.3)
2.7 Quality planning process is consistent with the elements of the quality system and addresses review of standards and specifications. (I.4.2.3)
3. Feasibility reviews are conducted to confirm the compatibility of design with the manufacturing process, including capacity planning and utilization. (I.4.2.3)
4. Engineering requirements are met at the required statistical process capability. (I.4.2.3)
5. Control plans are developed to the subsystem, component, and/or material level. (I.4.2.3)
6. Control plans include all special characteristics, related process and parameters - and are identified as such. (I.4.2.3)
7. Control plans are revised when appropriate for product and process changes or when processes are found to be unstable or non-capable. (I.4.2.3)
8. Control plans cover three phases: prototype, pre-launch, production (unless exempted by the customer). (I.4.2.3)

TABLE 1-continued

9. Process FMEAs consider all special characteristics. (I.4.2.3)
10. Adequate supporting procedures exist for each element of the quality manual. (4.2.2)
11. Special characteristics have been identified and included in the Control Plan(s). (I.4.2.3.a)
12. A comprehensive quality system (appropriate to the product or service produced) is established and implemented. (4.2.1)

4.3 CONTRACT REVIEW

1. Contract review activities are adequately documented and maintained to ensure that order requirements are understood and are within the supplier's capability prior to order acceptance. (I.4.3.2)
2. Standard's requirements (i.e. ISO-9000, QS-9000, NQA, etc.) and customer contract requirements are deployed into the quality system. (I.4.3.2)
3. Provisions to document and deploy contract changes throughout the organization exist. (I.4.3.3)
4. Contract review records are maintained. (I.4.3.4)

4.4 DESIGN CONTROL

1. Design plans for each project have been established and responsibility assigned. (I.4.4.2)
2. Responsible personnel are experienced in the "required skills" or appropriate equivalents. (I.4.4.2)
3. Applicable statutory and regulatory requirements are identified. (I.4.4.4)
4.1 Appropriate resources and facilities are available to use computer aided design, engineering and analysis. (I.4.4.4)
4.2 Technical leadership is provided when CAD/CAE is sub-contracted. (I.4.4.4)
5. Formal documented design reviews are conducted per the design plan. (I.4.4.5)
6. Design output is documented and expressed as requirements that can be verified. (I.4.4.6)
7.1 Design output meets design input requirements. (I.4.4.6)
7.2 Design output contains or references acceptance criteria. (I.4.4.6)
7.3 Design output includes a review of design output documents before release. (I.4.4.6)
8.1 Design outputs are the result of a process that used the "Design Techniques" or alternatives? (I.4.4.2) & (I.4.4.6)
8.2 Design outputs are the result of a process that used Geometric Dimensioning and Tolerancing (GDT). (I.4.4.6)
8.3 Design outputs are the result of a process that used analysis of cost/performance/risk trade-offs. (I.4.4.6)
8.4 Design outputs are the result of a process that used feedback from testing, production and the field. (I.4.4.6)
8.5 Design outputs are the result of a process that used analysis of design failure mode and effects (DFMEA. (I.4.4.6).
9. Performance testing (life, durability, reliability) is tracked for timely completion and conformance. (I.4.4.7)
10. A comprehensive prototype program exists (unless waived by the customer or made unnecessary by the generic nature of the product supplied). (I.4.4.7)
11. Design validation has been performed at the specified frequencies, results recorded, and failures addressed. (I.4.4.8)
12. Design changes are documented and approved by authorized personnel before implementation. (I.4.4.9)
13. Written customer approval or waiver has been obtained prior to a design change being implemented into production. (I.4.4.9)

4.5 DOCUMENT AND DATA CONTROL

1. New and revised documents are reviewed and approved by authorized personnel prior to issue. (I.4.5.2)
2. A master list (or equivalent) identifies document revision status. (I.4.5.2)
3. Timely review, distribution and implementation of customer engineering standards, specifications and changes. (I.4.5.2)
4. All referenced documents are available on-site. (I.4.5.1)
5. Special characteristic symbols or notations are shown on process control plans and similar documents. (I.4.5.1)
6. Where documents or data is retained on software, appropriate controls are maintained for changes. (I.4.5.1 & 3)

4.6 PURCHASING

1. Subcontractors are evaluated and selected based on their ability to meet quality system and quality assurance requirements. (I.4.6.2.a)
2. Appropriate level of control over subcontractors is maintained. (I,4.6.2.b)
3. Quality records of subcontractors are kept up to date and used to evaluate performance. (I.4.6.2.c)
4. Subcontractor development is conducted using the standard's requirements (i.e. ISO-9000, QSR (Sections I & II), NQA, etc.) as the fundamental quality system requirement. (I.4.6.2)
5. Purchasing documents contain data that clearly describe the product or service being ordered. (I.4.6.3)
6. Where applicable, there is provision for the customer (or representative) to verify subcontractor quality on the subcontractor's premises. (I.4.6.4.2)

4.7 CONTROL OF CUSTOMER SUPPLIED PRODUCT

1. Material is examined upon receipt to check quantity, identity, and transit damage. (I.4.7)
2. Material is periodically inspected to detect signs of deterioration, proper conditions & storage time limitations. (I.4.7)
3. For product that is lost, damaged or otherwise unsuitable for use, records are maintained and reports provided to the customer. (I.4.7)

4.8 PRODUCT IDENTIFICATION AND TRACEABILITY

1. Product is identified, where appropriate, at all production stages? (I.4.8)
2. Traceability is maintained and recorded when required by the customer? (I.4.8)

4.9 PROCESS CONTROL 1.1 Documented job instructions have been developed and are accessible at each work station. (I.4.9)
1.2 Documented job instructions communicate requirements to all employees involved. (I.4.9)
1.3 Documented job instructions provide for verification of job set-ups and tool change intervals. (I.4.9)
1.4 Documented job instructions specify monitoring of special characteristics. (I.4.9)
1.5 Documented job instructions list requirements for inspection, testing, gaging and recording results. (I.4.9)
1.6 Documented job instructions provide sample size and frequency. (I.4.9)
1.7 Documented job instructions establish approval and rejection criteria. (I.4.9)
1.8 Documented job instructions list required tools and gages (with mastering at required frequency). (I.4.9)
1.9 Documented job instructions describe the identification and handling of non-conforming material. (I.4.9)
1.10 Documented job instructions specify appropriate notifications and corrective actions (including plans for unstable/non-capable processes). (I.4.9)
1.11 Documented job instructions specify application of statistical methods required by control plans. (I.4.9)
1.12 Documented job instructions identify relevant engineering and manufacturing standards and the latest engineering change affecting the instruction. (I.4.9)
1.13 Documented job instructions display appropriate approvals and dates. (I.4.9)
1.14 Documented job instructions display operation name and number. (I.4.9)
1.15 Documented job instructions are keyed to process flow charts. (I.4.9)
1.16 Documented job instructions show part name and number. (I.4.9)
1.17 Documented job instructions show revision date for instructions. (I.4.9)
1.18 Documented job instructions define visual controls. (I.4.9)
2. Employees perform operations/inspections according to documented instructions.
3.1 Process control requirements are met.
3.2 The customer's preliminary process capability requirements are met. (I.4.9.2)
3.3 The customer's ongoing process performance requirements are met. (I.4.9.3)

TABLE 1-continued

| | |
|---|---|
| 3.4 | Special causes of variation are investigated and appropriate actions taken. (I.4.9.3) |
| 3.5 | Control charts are annotated with significant process events. (I.4.9.3) |
| 3.6 | Control charts are maintained and reviewed with highest priority given to special characteristics. (I.4.9.3) |
| 4.1 | Planned preventive maintenance system includes a maintenance schedule established with specific responsibilities assigned. (I.4.9.g) |
| 4.2 | Planned preventive maintenance system is evaluated for process capability improvement. (I.4.9.g) |
| 4.3 | Planned preventive maintenance system is evaluated for reduction of machine/process downtime. (I.4.9.g) |
| 4.4 | Maintenance is conducted at the prescribed frequencies for all equipment. (I.4.9.g) |
| 4.5 | Planned preventive maintenance system tracks availability of replacement parts for key manufacturing equipment. (I.4.9.g) |
| 4.6 | Planned preventive maintenance system uses predictive maintenance methods. (I.4.9.g) |
| 5. | A process exists to identify all applicable government safety and environmental regulations, including those concerning handling, recycling, eliminating, or disposing of hazardous materials. (I.4.9.b) |
| 6. | Possession of appropriate governmental certificates indicating compliance to the identified applicable regulations. (I.4.9.b) |
| 7. | Work environment is clean and well-organized. (I.4.9.b) |
| 8.1 | Evaluation areas for "appearance items" have appropriate lighting. |
| 8.2 | Appropriate masters of "appearance items" are available. |
| 8.3 | "Appearance Item" masters and evaluation equipment are adequately maintained. |
| 8.4 | Verification exists that personnel making appearance evaluation are qualified to do so. |

4.10 INSPECTION AND TESTING

| | |
|---|---|
| 1.1 | Purchased material is controlled and verified per the selected system prior to release production. (I.4.10.2) |
| 1.2 | Positive identification is provided for material used in production but not verified. (I.4.10.2) |
| 1.3 | Where specified as the control method, suppliers submit statistical data. (I.4.10.2) |
| 2.1 | Product is inspected and tested as required by the documented procedures. (I.4.10.3) |
| 2.2 | Product is held until the required inspections and tests have been completed. (I.4.10.3) |
| 2.3 | Defect prevention methods, such as statistical process control, error proofing, visual controls, is used rather than defect detection. (I.4.10.3) |
| 3.1 | Final inspection and testing is conducted in accordance with documented procedures. (I.4.10.4) |
| 3.2 | Final inspection and testing ensures no product is shipped until all activities specified in the documented procedures have been satisfactorily completed. (I.4.10.4) |
| 4. | Accredited laboratory facilities are used when required by the customer. (I.4.10.1,II.1) |
| 5.1 | Layout inspection is conducted per the Control Plan. (I.4.10.4) |
| 5.2 | Functional testing is conducted per Control Plan. (I.4.10.4) |
| 6. | Appropriate records are maintained for all inspections and tests. (I.4.10.5) |

4.11 INSPECTION, MEASURING, AND TEST EQUIPMENT

| | |
|---|---|
| 1. | Inspection, measuring, and test equipment (including software when appropriate) has been provided that is capable of the required accuracy and precision. (I.4.11.2.a) |
| 2. | Required accuracy/precision of inspection, measuring, and test equipment is determined. (I.4.11.2.a) |
| 3. | Measurement system analysis is conducted (Gage R & R) for all gages, measuring, and test equipment, noted on the control plan. (I.4.11.4) |
| 4. | Appropriate criteria (per the Measurement Systems Analysis Manual) is used for acceptance of measuring equipment. (I.4.11.4) |
| 5. | Where test software, hardware, or comparative references are used, capability and stability are verified prior to use (linearity and accuracy as appropriate). (I.4.11.2) |
| 6. | Each item of inspection, measurement, and test equipment is identified with a unique designation (including employee-owned equipment)? (I.4.11.3) |
| 7. | Each piece of inspection, measurement, and test equipment is calibrated at prescribed intervals and in the correct environment (including employee-owned equipment). (I.4.11.2.b) |
| 8. | Gage condition and actual readings are recorded prior to recalibration. (I.4.11.2.e) |
| 9. | Appropriate actions, including customer notification, are taken on product and process when inspection, measurement, or test equipment is found to be out of calibration. (I.4.11.2.f) |
| 10. | Inspection, measurement, and test equipment are properly handled, preserved, and stored to maintain calibration and fitness for use. (I.4.11.2.h) |
| 11. | Inspection, measurement, and test facilities (including software when applicable) are safeguarded to insure that calibration is not disturbed. (I.4.11.2.i) |
| 12. | Records exist for recalibration of part-specific gages, etc. following engineering changes. (I.4.11.2) |

4.12 INSPECTION AND TEST STATUS

| | |
|---|---|
| 1. | Inspection and/or test status is suitably identified throughout the production process. (I.4.1 2.1) |
| 2. | If required by the customer, additional verification requirements are met for launching of new products. (I.4.12.2) |

4.13 CONTROL OF NONCONFORMING PRODUCTS

| | |
|---|---|
| 1. | Systems ensure identification, documentation, segregation (where possible) to a designated area, and disposition of nonconforming and suspect product. (I.4.13.1) |
| 2. | Responsibilities for review and disposition of nonconforming and suspect product are clearly defined. (I.4.13.2) |
| 3. | Nonconforming and suspect products are reviewed according to defined procedures. (I.4.13.2) |
| 4.1 | Systems ensure nonconforming and suspect parts are reviewed to specified requirements. (I.4.13.2) |
| 4.2 | Systems ensure nonconforming and suspect parts are accepted with customer-approved concessions (EAPAs). (I.4.1 3.2) |
| 4.3 | Systems ensure nonconforming and suspect parts are reworked to approved repair standards. (I.4.13.2) |
| 4.4 | Systems ensure nonconforming and suspect parts are regraded for alternative applications. (I.4.13.2) |
| 4.5 | Systems ensure nonconforming and suspect parts are rejected or scrapped. (I.4.13.2) |
| 5. | Processes assure that only material that has passed inspections and/or tests can be proided to the customer. (I.4.13.2) |
| 6. | Nonconformances are recorded to permit defect analysis. (I.4.13.3) |
| 7. | Reworked products are reinspected and/or tested according to the Control Plan. (I.4.13.2) |
| 8. | Repair/rework instructions are accessible and utilized by the appropriate personnel. (I.4.13.3) |
| 9. | Where applicable, approvals are obtained for products supplied for service applications that may have visible rework. (I.4.13.3) |
| 10. | Systems ensure that customer authorization is received prior to shipping nonconforming material. (I.4.13.4) |
| 11. | Records are maintained of the expiration dates for engineering approved product authorizations (EAPAs) and quantities authorized. (I.4.13.4) |

4.14 CORRECTIVE AND PREVENTIVE ACTION

| | |
|---|---|
| 1. | Appropriate corrective actions are developed to eliminate causes of nonconformances? (I.4.14.2.c) |
| 2. | Disciplined problem solving methods are used. (I.4.14.1) |
| 3. | Customer complaints and reports of nonconformances are effectively handled. (I.4.1 4.2.a) |
| 4. | Causes of nonconformances are investigated and the results documented. (I.4.1 4.2.b) |
| 5. | Effectiveness of corrective action is verified. (I.4.14.2.d) |
| 6. | Returned parts from customer's locations are analyzed and corrective actions are initiated. (I.4.14.2) |
| 7. | Nonconformance reports, (e.g. product quality, deviation, audit result, quality records, etc.) are used to develop preventive actions. (I.4.14.3.a) |
| 8. | Relevant information on actions taken including changes to procedure are submitted for management review. (I.4.14.3.d) |

TABLE 1-continued

4.15 HANDLING, STORAGE, PACKAGING, PRESERVATION AND DELIVERY

1. Material handling methods prevent product damage and deterioration. (I.4.15.2)
2. Storage areas are appropriate for preventing damage or deterioration of the product. (I.4.15.3)
3. When required by the nature of the product, the condition of product in stock is checked at intervals to detect deterioration. (I.4.15.3)
4. Systems control the packing, packaging, and marking processes to the ext necessary to ensure product conformance to specifications. (I.4.15.4)
5. Applicable customer packaging standards are available. (I.4.15.4)
6. Compliance to applicable customer packaging standards. (I.4.15.4)
7. Appropriate methods are used for product preservation and segregation. (I.4.15.5)
8. Systems ensure the protection of product quality during delivery to the destination. (I.4.15.6)
9. Appropriate analyses and corrective actions are used when scheduled delivery performance is not 100%. (I.4.15.6)
10. Inventory management system optimizes inventory turns and stock rotation. (I.4.15.6)

4.16 CONTROL OF QUALITY RECORDS

1. Records show effective operation of the quality system, including pertinent sub-contractor quality records. (I.4.16)
2. Quality records are legible and readily retrievable. (I.4.16)
3. Quality records (hardcopy or electronic) are stored in a suitable environment to prevent deterioration, damage, or loss. (I.4.16)
4.1 Quality records are retained per established procedures. (I.4.16)
4.2 Quality records include production part approval, control charts, internal quality audits, and failure mode and effects analysis (FMEAs). (I,4,16)
5. Quality records are available to the customer. (I.4.16)
6. Systems ensure retention control and timely disposal of quality records. (I.4.16)

4.17 INTERNAL QUALITY AUDITS

1. Internal quality system audits are conducted as planned. (I.4.17)
2. Personnel conducting the audit are independent of the function being audited. (I.4.17)
3. Audits are scheduled on the basis of the status and importance of the activity. (I.4.17)
4. Audit results are documented and brought to the attention of the responsible personnel. (I.4.17)
5. Corrective actions are timely, recorded, and evaluated for effectiveness. (I.4.17)
6. Audits include work environment and general housekeeping. (I.4.17)

4.18 TRAINING

1. Training needs for all personnel performing activities affecting quality are met. (I.4.18)
2. Qualifications for jobs affecting quality include identification of appropriate education, training needs, and experience. (I.4.18)
3. Training records are maintained. (I.4.18)
4. Training effectiveness is periodically evaluated. (I.4.18)

4.19 SERVICING

1. Servicing meets the specified requirements. (I.4.19)
2. Reporting and verification systems are established to communicate data from servicing functions to supplier manufacturing, engineering and design activities. (I.4.19)

4.20 STATISTICAL TECHNIQUES

1. Need of statistical techniques for establishing, controlling, and verifying the capability of process parameters and product characteristics has been identified. (I.4.20.1)
2. Procedures are established and maintained to implement and control the application of statistical techniques. (I.4.20.2)
3. Advanced quality planning is used to determine the appropriate statistical techniques. (I.4.20.2)
4. Concepts of variation, control (stability), capability, and over-control are understood throughout the organization. (I.4.20.2)

II.1 PRODUCTION PART APPROVAL PROCESS

1. Complete supporting data exists for all production part approval submissions.
2. Supporting data shows conformance to all customer requirements, including change notification. (I.4.9.6,II.1)
3. Supporting data is organized and filed together for each part.
4. Materials are purchased from customer approved subcontractor list. (I.4.6.1)

II.2 CONTINUOUS IMPROVEMENT

1. Continuous quality and productivity improvement efforts are a key element of the company's business.
2. Specific improvement projects have been identified.
3. Appropriate measurables are identified for improvement projects.
4. Evidence of improvement in project measurables exists over relevant time periods (from six months to five years).

II.3 MANUFACTURING CAPABILITIES

1. Cross-functional teams are used for facilities, equipment, and process planning in conjunction with the advanced quality planning process.
2. Plant layout minimizes material travel and handling, facilitating synchronous material flow, and maximizing value added use of floor space.
3. Mistake proofing techniques are utilized where appropriate.
4. Resources are available for tool and gage design (If subcontracted, rate the tracking and follow-up system).
5. Resources are available for tool and gage fabrication (If subcontracted, rate the tracking and follow-up system).
6. Resources are available for complete tool and gage dimensional inspection (If subcontracted, rate the tracking and follow-up system).
7. Resources are available for tool and gage maintenance and repair (If subcontracted, rate the tracking and follow-up system).

What is claimed:

1. A method of using a computer system to gather information about an organizational process or system, comprising:

obtaining information about an organization to be assessed, wherein the information comprises information regarding assessors;

the computer system preparing at least one question regarding the organizational process or system by analyzing the obtained information about the organization;

the computer system displaying on a display device a first user adjustable icon and a second user adjustable icon and at least one question, the first user adjustable icon being adjustable within a first allowed range; the second user adjustable icon being adjustable within a second allowed range; and wherein the at least one question being adapted to prompt the assessor to input the assessor's perceptions of the organizational process or system;

the computer system receiving a first quantitative input from a user, the first input corresponding to movement of the first user adjustable icon;

the computer system determining a second allowed input range for a second user adjustable icon based on the first input, wherein the bottom of the determined second allowed input range for the second user adjustable icon is the value of the first quantitative input;

the computer system displaying the second user adjustable icon such that the full width of the second user adjustable icon corresponds to the determined second allowed input range; and the computer system receiving a second quantitative input from the user, the second input corresponding to movement of the second user adjustable icon.

2. The method of claim 1, wherein the first user adjustable icon comprises a sliding bar icon.

3. The method of claim 1, wherein the inputs are numeric inputs.

4. The method of claim 1, wherein displaying comprises displaying remotely.

5. The method of claim 1, wherein displaying comprises displaying across a global computer network.

6. The method of claim 1, wherein the second user adjustable icon comprises a sliding bar icon.

7. The method of claim 1, wherein the first input corresponds to the users perception of an aspect of a process or system in a present state.

8. The method of claim 1, wherein the second input corresponds to the users estimate of an aspect of a process or system in a projected future state.

9. The method of claim 1, wherein determining the second allowed input range for the second user adjustable icon comprises setting a minimum allowed value or the second allowed input range to be equal to the first input.

10. The method of claim 1, wherein determining the second allowed input range for the second user adjustable icon comprises setting a maximum allowed value or the second allowed input range to be equal to the first input.

11. The method of claim 1, further comprising analyzing the inputs to determine if one or more problem areas are present in the organizational process or system.

12. The method of claim 11, wherein analyzing the inputs comprises comparing input from two or more assessors to one another.

13. The method of claim 11, wherein analyzing the inputs comprises comparing input from two or more similar questions to one another.

14. The method of claim 1, further comprising displaying on the display device at least one corrective action question, the at least one corrective action question being adapted to prompt the assessor to input on the input device the assessor's perception of the problem area of the organizational process or system.

15. The method of claim 14, further comprising receiving at least one corrective action input, the corrective action input being stored in the computer's memory.

16. The method of claim 1, wherein at least one of the first and second inputs are on a numerical scale, the scale being 1 to 10, 1 to 100, or 0 to 100 percent.

17. The method of claim 1, further comprising evaluating the organizational process or system by comparing inputs from the assessor with known empirically-gathered information.

18. The method of claim 1, further comprising using the first and second inputs together to evaluate the organizational process or system.

19. The method of claim 1, wherein the computer comprises a PDA.

20. The method of claim 1, further comprising multiplying the first input with the second input to evaluate the organizational process or system.

21. The method of claim 1, further comprising using differences between the first input and the second input to evaluate the organizational process or system.

22. The method of claim 1, further comprising receiving first and second inputs from a plurality of assessors, and determining the standard deviation of the first input, and the standard deviation of the second input, from the inputs received from the assessors, and then using a standard deviation to evaluate at least a portion of the organizational process or system.

23. The method of claim 1, further comprising preparing an assessment timeline based on assessor input.

24. The method of claim 23, further comprising notifying the assessor of a deadline identified in the assessment timeline.

25. The method of claim 23, further comprising escalating a notification to one or more predetermined individuals if a response is not received from an assessor within a predetermined period of time.

26. The method of claim 1, further comprising prompting an assessor to provided recommendations to improve the organizational process or system.

27. The method of claim 1, further comprising performing an onsite assessment directed to one or more problem areas determined to be present in the organizational process or system.

28. The method of claim 1, further comprising performing an onsite assessment directed to one or more problem areas determined to be present in the organizational process or system, wherein one ore more onsite assessor are provided with a list of the problem areas and a list of the corrective actions input.

29. The method of claim 28, further comprising providing at least one onsite assessor with a PDA having a list of the problem areas and a list of the corrective actions input.

30. The method of claim 28, wherein the results of the onsite assessment are input into the computer and stored in the computer's memory.

31. The method of claim 28, wherein the results provided by each onsite assessor are adjusted by a bias value identified for that assessor.

* * * * *